US006785029B2

(12) United States Patent
Takada et al.

(10) Patent No.: US 6,785,029 B2
(45) Date of Patent: Aug. 31, 2004

(54) OPTICAL SCANNER (75) Inventors: Kyu Takada, Otsu (JP); Takuji Hatano, Suita (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/865,625

(22) Filed: May 29, 2001

(65) Prior Publication Data

US 2002/0041419 A1 Apr. 11, 2002

(30) Foreign Application Priority Data

May 29, 2000 (JP) .......................... 2000-157609

(51) Int. Cl.⁷ .............................. G02B 26/08
(52) U.S. Cl. ................ 359/196; 359/204; 359/205; 359/208; 359/216; 359/488
(58) Field of Search ............... 359/196–226, 359/487, 488

(56) References Cited

U.S. PATENT DOCUMENTS 5,438,446 A * 8/1995 Brandt ............... 359/196
5,970,034 A 10/1999 Sakuma et al.
5,991,063 A 11/1999 Ando
6,172,787 B1 1/2001 Naiki

FOREIGN PATENT DOCUMENTS

| JP | 08-338957 | 12/1996 |
| JP | 9-288244 | 11/1997 |

* cited by examiner

*Primary Examiner*—James Phan
(74) *Attorney, Agent, or Firm*—Burns, Doane, Swecker & Mathis, L.L.P.

(57) ABSTRACT

An optical scanner having a simple structure in which the light quantities of a plurality of light beams are not varied by differences in polarization direction among the light beams. The optical scanner scans a surface by means of a plurality of light beams in which the polarization direction of at least one of the light beams is different from the polarization directions of the other light beams. An optical element having a surface with a reflectance for s-polarized light and a reflectance for p-polarized light that are substantially the same at a given incident angle is provided in the optical paths of the light beams.

27 Claims, 8 Drawing Sheets

OPTICAL SCANNER

RELATED APPLICATION

This application is based on application No. 2000-157609 filed in Japan, the content of which is incorporated herein by reference.

FIELD OF THE INVENTION

The present invention relates to an optical scanner provided in an image forming apparatus such as a laser beam printer, and more particularly, to an optical scanner that scans a surface by means of a plurality of light beams.

DESCRIPTION OF THE PRIOR ART

In an image forming apparatus such as a laser beam printer, a surface to be scanned (for example, the surface of a photoconductor drum) is scanned by a light beam to thereby form an image on the surface.

Typically, scanning is performed by deflecting the light beam from a light source in one direction by a deflector such as a rotating polygon mirror, and varying the relative positions of the light beam and the surface to be scanned in a direction perpendicular to the direction of the deflection. Deflecting the light beam is called main scanning, and the direction thereof is called the main scanning direction. Varying the relative positions of the light beam and the surface to be scanned in a direction perpendicular to the main scanning direction is called sub-scanning, and the direction thereof is called the sub-scanning direction.

In recent years, to increase the speed of image formation, scanning is performed by means of a plurality of light beams spaced a minute distance apart in the sub-scanning direction. There have been proposed various methods for obtaining light beams spaced a minute distance apart, and they are broadly divided into those using a single light source and those using a plurality of light sources.

For example, in Japanese Laid-open Patent Application No. 9-281420, a plurality of light beams spaced a minute distance apart are directly obtained from a single surface emitting laser having a plurality of light emitting portions, and in Japanese Laid-open Patent Application No. H8-338957, a plurality of lasers and a plurality of optical fibers are used, and the light beams from the lasers are conducted by the optical fibers so as to be spaced a minute distance apart at the scanned surface. Moreover, in Japanese Laid-open Patent Application No. 9-218363, two lasers and a polarization beam splitter are used, and two light beams spaced a minute distance apart and traveling substantially in the same direction are obtained by transmission and reflection by the polarization beam splitter.

Generally, an optical scanner requires several optical elements such as a collimator lens for collimating light beams and an imaging lens for converging the collimated light beams on the surface to be scanned, in addition to the deflector for the main scanning. To prevent contamination and damage, the deflector is housed in a case having a glass window that allows light beams to pass therethrough. Further, a mirror for bending the optical paths of the light beams is sometimes provided to reduce the overall size.

In many cases, a thin film for enhancing reflectance or transmittance is provided on the surface of each optical element. Typical film structures of reflection surfaces and transmission surfaces of optical elements of a conventional optical scanner are shown in Tables 1 to 6. The refractive index n, the optical film thickness nd and the absorption coefficient k shown in these tables are for a light beam of a wavelength $\lambda$ of 780 nm.

TABLE 1

Reflection surface RX (wavelength $\lambda$ = 780 nm)

| Material | Refractive Index n | Absorption Coefficient k |
|---|---|---|
| Al | 1.92 | 7.08 |

TABLE 2

Reflection surface RY (wavelength $\lambda$ = 780 nm)

| | Material | Refractive Index n | Optical Thickness nd | Absorption Coefficient k |
|---|---|---|---|---|
| First Layer | TiO$_2$ | 2.35 | 0.25$\lambda$ | |
| Second Layer | MgF$_2$ | 1.38 | 0.25$\lambda$ | |
| | Al | 1.92 | | 7.08 |

TABLE 3

Reflection surface RZ (wavelength $\lambda$ = 780 nm)

| | Material | Refractive Index n | Optical Thickness nd | Absorption Coefficient k |
|---|---|---|---|---|
| First Layer | TiO$_2$ | 2.35 | 0.25$\lambda$ | |
| Second Layer | MgF$_2$ | 1.38 | 0.25$\lambda$ | |
| Third Layer | TiO$_2$ | 2.35 | 0.25$\lambda$ | |
| Fourth Layer | MgF$_2$ | 1.38 | 0.25$\lambda$ | |
| | Al | 1.92 | | 7.08 |

TABLE 4

Transmission surface TX (wavelength $\lambda$ = 780 nm)

| Material | Refractive Index n |
|---|---|
| BK7 | 1.51 |

TABLE 5

Transmission surface TY (wavelength $\lambda$ = 780 nm)

| | Material | Refractive Index n | Optical Thickness nd |
|---|---|---|---|
| First Layer | MgF$_2$ | 1.38 | 0.25$\lambda$ |
| | BK7 | 1.51 | |

TABLE 6

Transmission surface TZ (wavelength $\lambda$ = 780 nm)

| | Material | Refractive Index n | Optical Thickness nd |
|---|---|---|---|
| First Layer | MgF$_2$ | 1.38 | 0.25$\lambda$ |
| Second Layer | ZrO$_2$ | 2.10 | 0.50$\lambda$ |
| Third Layer | Al$_2$O$_3$ | 1.62 | 0.25$\lambda$ |
| | BK7 | 1.51 | |

The reflection surface RX of Table 1, which has the simplest structure, comprises only a reflection film of Al.

The reflection surface RY of Table 2 has two layers of thin films of $MgF_2$ and $TiO_2$ on a reflection film of Al. For the layer numbering of the thin films in the various surfaces, the outermost layer is numbered 1. The reflection surface RZ of Table 3 has four layers of thin films of $MgF_2$ and $TiO_2$ on a reflection film of Al.

The transmission surface TX of Table 4 having the simplest structure as only BK7 glass which is the base material of the element. The transmission surface TY of Table 5 has one layer of thin film of $MgF_2$ on the base material of BK7 glass. The transmission surface TZ of Table 6 has three layers of thin films of $Al_2O_3$, $ZrO_2$ and $MgF_2$ on the base material of BK7 glass.

The refractive indices n of the thin films provided on the reflection surfaces RY and RZ and the transmission surfaces TY and TZ depend on the material, and the optical film thickness nd of the thin films are ¼ or ½ of the wavelength λ.

Reflection surfaces and transmission surfaces of the above-described structures which have been used in optical scanners using a single light beam are also used in optical scanners which employ a plurality of light beams. However, when reflection surfaces and transmission surfaces of optical elements of optical scanners using a plurality of light beams are disposed as described below, the light quantities of the light beams on the surface to be scanned vary due to a disagreement in polarization direction among the light beams, so that the densities of the images formed by the light beams vary. This is because, when the polarization directions of the light beams are different, the reflectance and the transmittance vary according to the incident angle.

Figure 11:
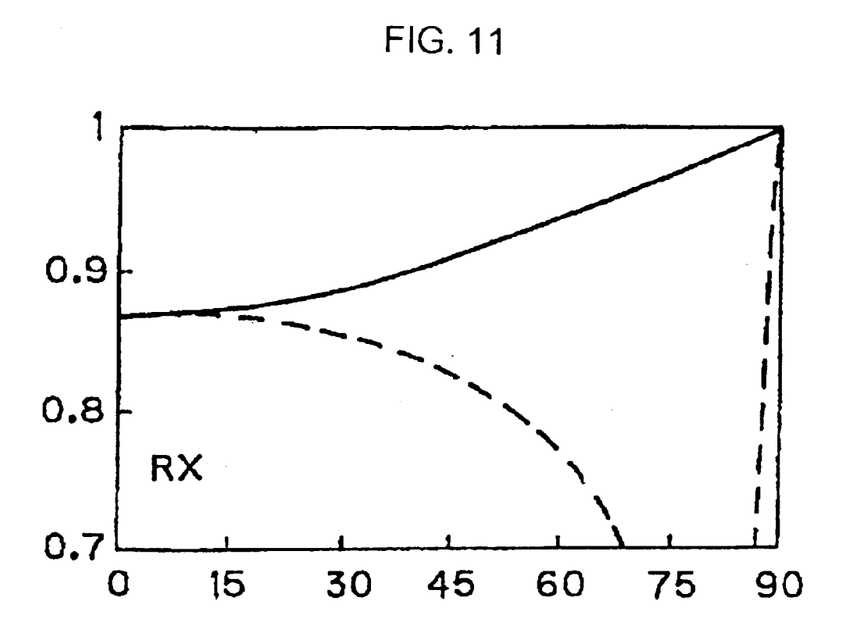
FIG. 11 is a view showing the relationships between the reflectances for s-polarized light and for p-polarized light and the incident angle on the conventional reflection surface RX.
Figure 12:
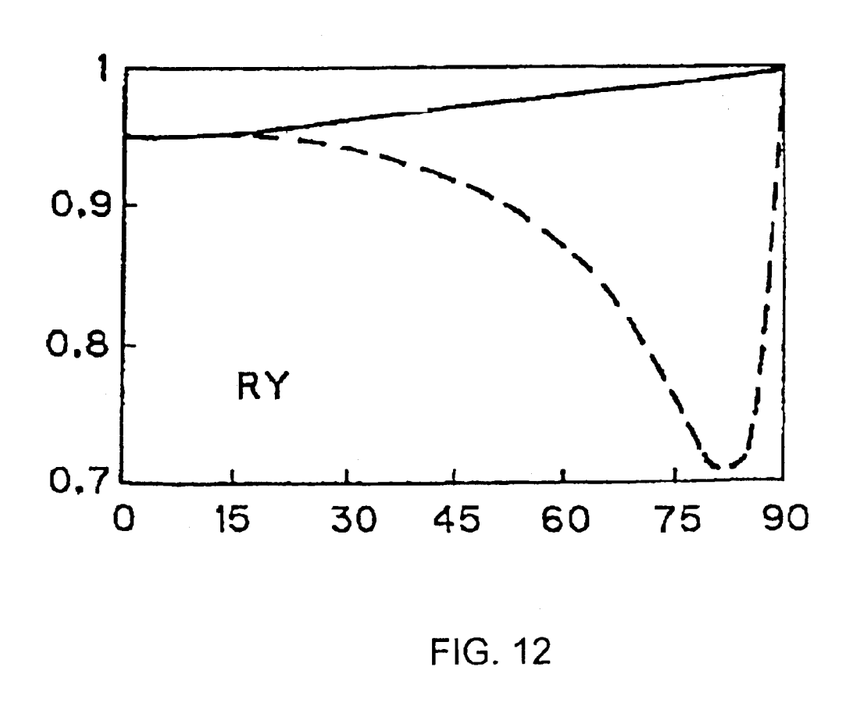
FIG. 12 is a view showing the relationships between the reflectances for s-polarized light and for p-polarized light and the incident angle on the conventional reflection surface RY.
Figure 13:
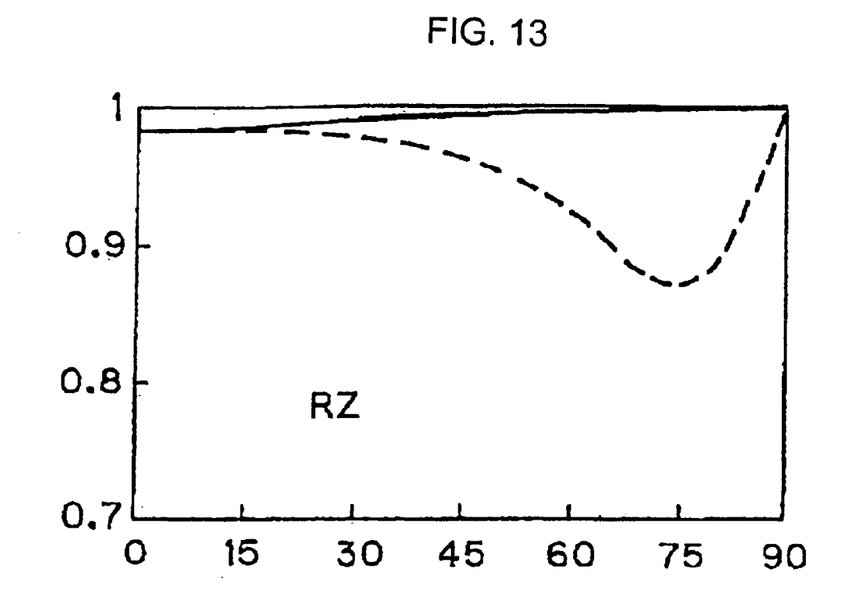
FIG. 13 is a view showing the relationships between the reflectances for s-polarized light and for p-polarized light and the incident angle on the conventional reflection surface RZ.
Figure 14:
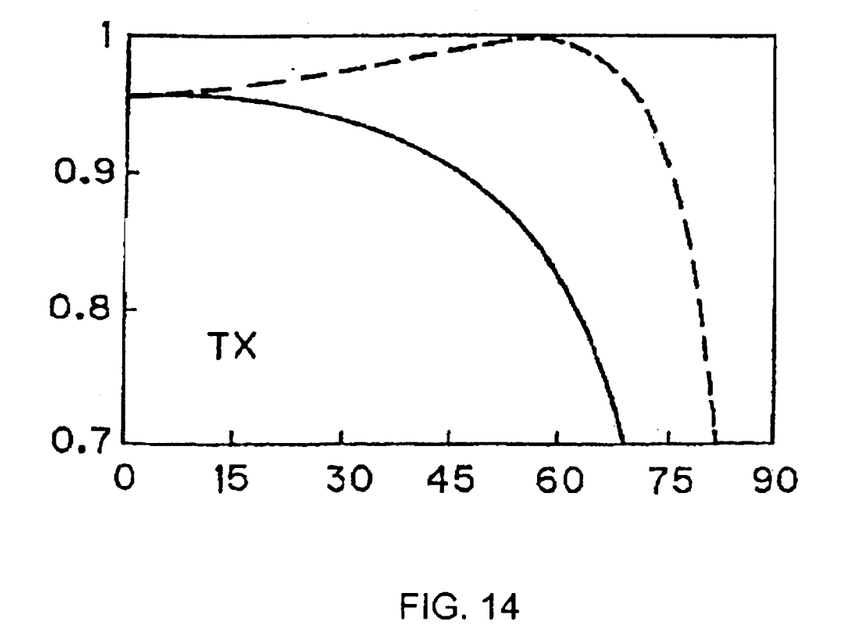
FIG. 14 is a view showing the relationships between the transmittances for s-polarized light and for p-polarized light and the incident angle on the conventional transmission surface TX.
Figure 15:
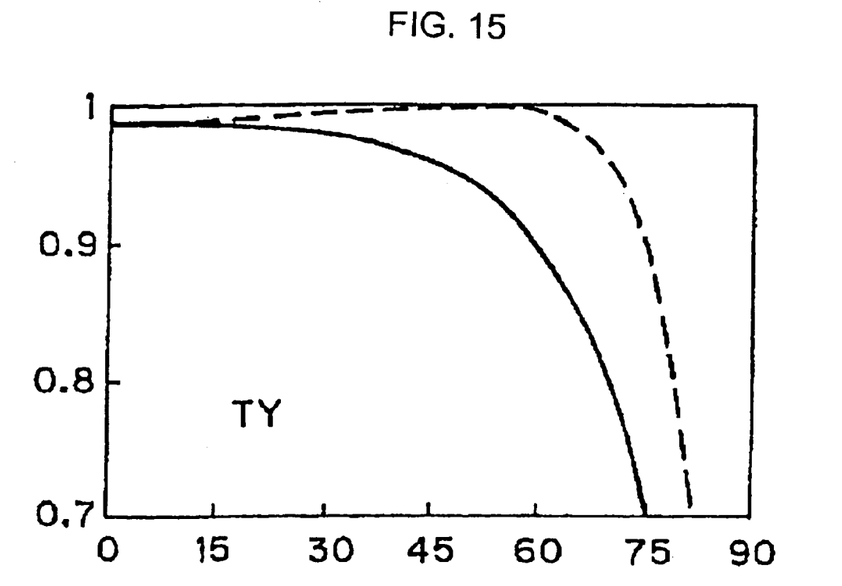
FIG. 15 is a view showing the relationships between the transmittances for s-polarized light and for p-polarized light and the incident angle on the conventional transmission surface TY.
Figure 16:
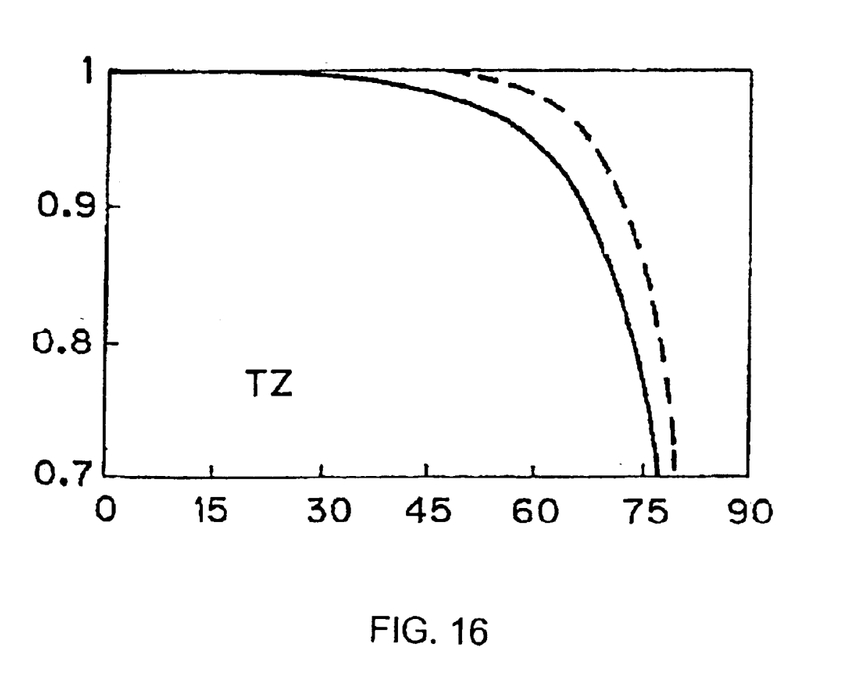
FIG. 16 is a view showing the relationships between the transmittances for s-polarized light and for p-polarized light and the incident angle on the conventional transmission surface TZ.

The relationships between the reflectances for s-polarized light and for p-polarized light and the incident angle on the reflection surfaces RX, RY and RZ of Tables 1 to 3 are shown in FIGS. 11 to 13. The relationships between the transmittances for s-polarized light and for p-polarized light and the incident angle on the transmission surfaces TX, TY and TZ of Tables 4 to 6 are shown in FIGS. 14 to 16. As is apparent from these figures, s-polarized light is more easily reflected than p-polarized light, and the differences in reflectance and transmittance between these two types of polarized light increases as the incident angle increases.

Generally, the angle of incidence of light beams on the deflector such as a rotating polygon mirror performing the main scanning is at most approximately 60° and the angle of incidence on the window of the case of the deflector is also at most approximately 60°. When the simple reflection surface RX is used as the reflection surfaces of the deflector, the difference between the reflectance for s-polarized light and the reflectance for p-polarized light at an incident angle of 60° is as large as 17.1%. Even when the reflection surface RY or RZ having a thin film is used as the reflection surface of the deflector, the difference between the reflectances for the two types of polarized light at an incident angle of 60° is 11.1% or 7.4%, which is still large. When the simple transmission surface TX is used for the window of the case, the difference between the transmittance for s-polarized light and the transmittance for p-polarized light at an incident angle of 60° is 17.8%, and even when the transmission surface TY or TZ is used for the window, the difference between the transmittances for the two types of polarized light at an incident angle of 60° is no less than 9.7% or 3.7%.

A light beam that is incident on the deflector at a large angle is directed to one end of the main scanning direction, and when there is a large difference between the reflectances or the transmittances for an s-polarized light beam and for a p-polarized light beam as described above, the light quantities of the two light beams are largely different at the end of the main scanning direction, so that a large difference in density is caused between the images formed by the two beams in a peripheral region of the surface to be scanned. When a plurality of reflection surfaces and transmission surfaces are provided in an optical scanner, the difference between the reflectance for s-polarized light and the reflectance for p-polarized light is cumulative, which increases the difference in light quantity between the light beams on the surface to be scanned.

The difference in polarization direction among a plurality of light beams occurs in any of the methods of the above-mentioned patent applications, The polarization directions of the light beams emitted by a surface emitting laser vary among the light emitting portions, and the relative polarization direction of the plurality of light beams is not determined. Since optical fibers change the polarization directions of the light beams that they transmit, even if the polarization directions of the light beams emitted by the laser are the same, the polarization directions of the light beams conducted by means of optical fibers are not the same. Further, since the polarization beam splitter reflects or transmits a light beam according to whether the light beam is s-polarized or p-polarized, the polarization directions of two light beams that have passed therethrough are intrinsically different.

There have also been proposed methods for making the polarization directions of a plurality of light beams the same. For example, in the above-mentioned Japanese Laid-open Patent Application No. 8-338957 using optical fibers, each laser is made rotatable or a half-wave plate is rotatably disposed between each laser and each optical fiber, and the rotation amount of each laser or each half-wave plate is adjusted so that the polarization directions of all the light beams conducted by means of the optical fibers are the same.

In the above-mentioned Japanese Laid-open Patent Application No. 9-218363 using a polarization beam splitter, a quarter-wave plate is disposed in the optical paths of the light beams that have passed through the beam splitter to thereby convert the two light beams from linearly polarized light to circularly polarized light. The polarization direction can be limited by a polarizing plate. Japanese Laid-open Patent Application No. 9-288244 discloses an apparatus adopting this method.

However, according to the method of adjusting the rotation amounts of the lasers which are light sources, or the half-wave plates to thereby make the polarization directions of a plurality of light beams the same, the adjustment of the rotation amounts requires time and labor, which decreases manufacturing efficiency. Further, since a mechanism for rotatably holding the light sources or the half-wave plates is required, the apparatus is complicated.

According to the method of converting linearly polarized light into circularly polarized light by use of a quarter-wave plate, since quarter-wave plates are expensive, the cost is high. Further, this method cannot be applied to structures using a surface emitting laser or structures using optical fibers. This is because, although it is necessary to dispose the quarter-wave plate with the principal axis thereof inclined 45° with respect to the polarization direction, it is impossible to dispose it in such a manner for all the light beams having different polarization directions.

According to the method of limiting the polarization direction by use of a polarizing plate, the light quantity loss is large. Further, since the light is all lost when the polarization direction of the polarizing plate and that of the light beam are perpendicular to each other, the larger the number of light beams is, the more difficult the setting of the inclination of the polarizing plate with respect to the light beams becomes.

SUMMARY OF THE INVENTION

The present invention is made in view of the foregoing problem, and an object thereof is to provide an optical scanner having a simple structure in which the light quantities of a plurality of light beams are not varied by differences in polarization direction among the light beams.

In an optical scanner that scans a surface to be scanned by means of a plurality of light beams in which the polarization direction of at least one of the light beams is different from the polarization directions of the other light beams, this object is achieved by an optical element having a surface with a reflectance for s-polarized light and a reflectance for p-polarized light that are substantially the same at a given incident angle, which is provided in the optical paths of the light beams.

BRIEF DESCRIPTION OF THE DRAWINGS

This and other objects and features of this invention will become clear from the following description, taken in conjunction with the preferred embodiments with reference to the accompanying drawings in which.

DESCRIPTION IF THE PREFERRED EMBODIMENT

According to an embodiment of the present invention, in an optical scanner that scans a surface by means of a plurality of light beams in which the polarization direction of at least one of the light beams is different from the polarization directions of the other light beams, an optical element having a surface whose reflectance for s-polarized light and reflectance for p-polarized light are substantially the same at a given incident angle is provided in the optical paths of the light beams.

Since the reflectance for s-polarized light and the reflectance for p-polarized light are substantially the same, the transmittance for s-polarized light and the transmittance for p-polarized light are also substantially the same. Consequently, such a surface can be used either as a reflection surface or a transmission surface by increasing or decreasing the reflectance. Since the reflectance for s-polarized light and the reflectance for p-polarized light are substantially the same at a given incident angle, that is, at any incident angle in a range of 0 to 90°, there is hardly any difference in light quantity among the beams reflected by the surface or having passed through the surface, as long as the incident angles of the s-polarized light beam and the p-polarized light beam are the same. Therefore, the light quantities of the beams in the respective parts of the surface to be scanned can be made the same even though the apparatus uses a plurality of light beams where the polarization direction of at least one of the light beams is different from the polarization directions of the other light beams.

While all the optical elements in the optical scanner may be provided with such a surface, the light quantity difference among the beams on the surface to be scanned can be reduced by providing such a surface only for an optical element on which the light beams are incident at varied angles, for example, the deflector that deflects the light beams for scanning.

Moreover, according to the invention, in an optical scanner that scans a surface to be scanned by means of a plurality of light beams emitted from a surface emitting laser, an optical element having a surface where the reflectance for s-polarized light and the reflectance for p-polarized light are substantially the same at a given incident angle is provided in the optical paths of the light beams.

Further, according to the embodiment, in an optical scanner that scans a surface to be scanned by means of a plurality of light beams emitted from a plurality of optical fibers, an optical element having a surface where the reflectance for s-polarized light and the reflectance for p-polarized light are substantially the same at a given incident angle is provided in the optical paths of the light beams.

Although the polarization directions of a plurality of light beams from a surface emitting laser or a plurality of light beams having passed through different optical fibers are not the same as mentioned above, by providing an optical element disposed in the optical paths of the light beams with a surface where the reflectance for s-polarized light and the reflectance for p-polarized light are substantially the same at a given incident angle, the light quantities of the beams can be prevented from varying due to the difference in polarization direction.

The reflectance for s-polarized light and the reflectance for p-polarized light on the surface of an optical element are considered to be substantially the same when the difference between them is set to be not more than 3% in an incident angle range of 0 to 60°. By doing so, a plurality of beams, the light quantities of which are substantially the same, can be directed to any parts of the surface to be scanned.

An optical element using the above-mentioned surface as a reflection surface is a reflection element. In this case, the optical element may have a structure having only one layer of thin film on the surface. Such a structure can be realized by setting the thickness of the layer of thin film to be less than ¼ of the wavelength of a plurality of light beams. When the optical element is a reflection element, the optical element may have a structure comprising only three layers of thin films on the surface. Such a structure can be realized by setting the reflectance of the central one of the three layers to the highest value. In any case, the film structure is simple.

When the above-mentioned surface is a transmission surface, the optical element is a transmission element. In this case, the optical element may have a structure comprising only three layers of thin films on the surface. The film structure is simple as in the case where the surface is a reflection surface.

Figure 1:
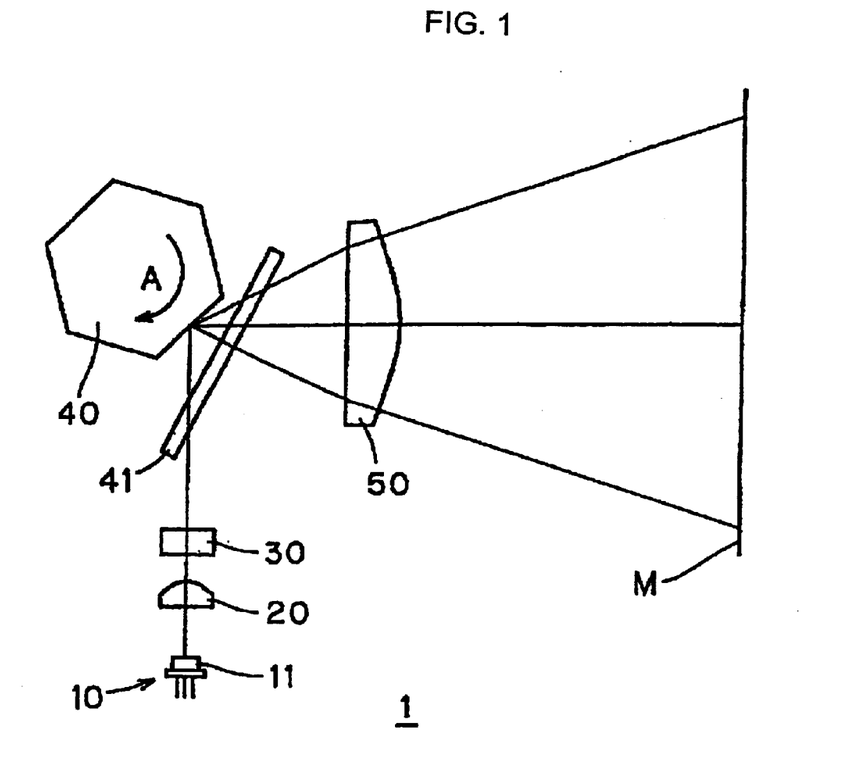
FIG. 1 is a plan view schematically showing the structure of an optical scanner according to an embodiment of the present invention.

Now, the embodiment of the optical scanner of the present invention will be described in more detail with reference to the drawings. The structure of an optical scanner 1 of the embodiment is schematically shown in FIG. 1. The optical scanner 1 scans a surface M to be scanned by means of a plurality of light beams. FIG. 1 is a plan view viewed from the sub scanning direction. The optical scanner 1 has a light source portion 10, a collimator lens 20, a cylindrical lens 30, a rotating polygon mirror 40, and an imaging lens 50.

The light source portion 10 which comprises only a surface emitting laser 11 emits, in the same direction, a plurality of light beams of a wavelength λ of 780 nm having different polarization directions. The number of light beams emitted by the light source portion 10 is four, and these light beams are spaced a minute distance apart in the sub scanning direction perpendicular to the plane of FIG. 1.

The collimator lens 20 collimates the light beams from the light source portion 10. The cylindrical lens 30 which has a positive optical power only in the sub scanning direction converges the light beams collimated by the collimator lens 20 in the sub scanning direction in the vicinity of the rotating polygon mirror 40.

The rotating polygon mirror 40 which is regularly hexagonal in shape reflects the light beams having passed through the cylindrical lens 30 so that they are directed to the surface M to be scanned, and is rotated in the direction of the arrow A by a non-illustrated motor so that the surface M to be scanned is scanned by means of the reflected light beams. That is, the rotating polygon mirror 40 is a deflector performing the main scanning. To prevent contamination and damage, the rotating polygon mirror 40 is housed in a case (not shown). The case is provided with a window 41 for allowing the light beams from the cylindrical lens 30 to enter the case and allowing the light beams reflected by the rotating polygon mirror 40 to exit from the case. The window 41 is made of BK7 glass.

The imaging lens 50 which is an fθ lens having a positive optical power in the main scanning direction converges the light beams reflected by the rotating polygon mirror 40 on the surface M to be scanned. The imaging lens 50 is also made of BK7 glass. The light beams form point images spaced a minute distance apart in the sub scanning direction on the surface M to be scanned, and a two-dimensional image is formed by combining the movement of each point image in the main scanning direction with a movement of the surface M to be scanned in the sub scanning direction.

Figure 2:
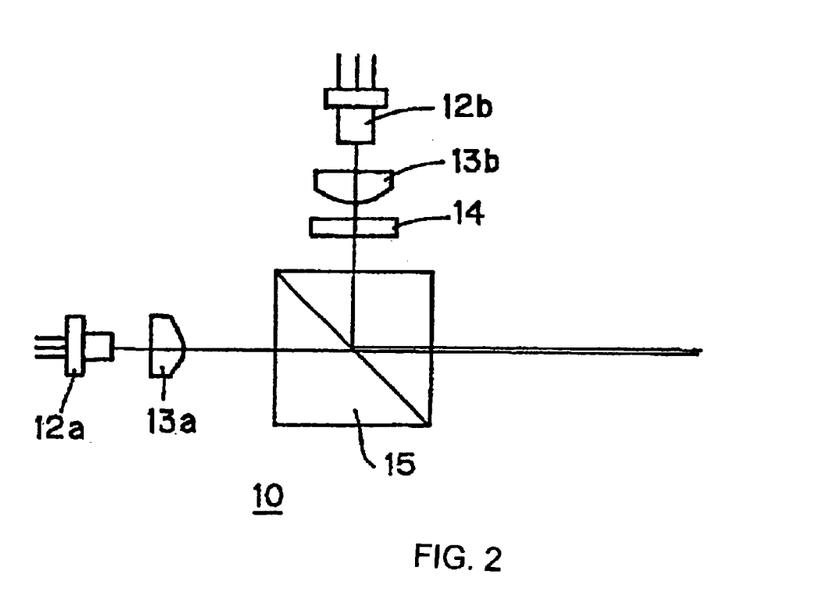
FIG. 2 is a view showing another structure of a light source portion of the optical scanner.
Figure 3:
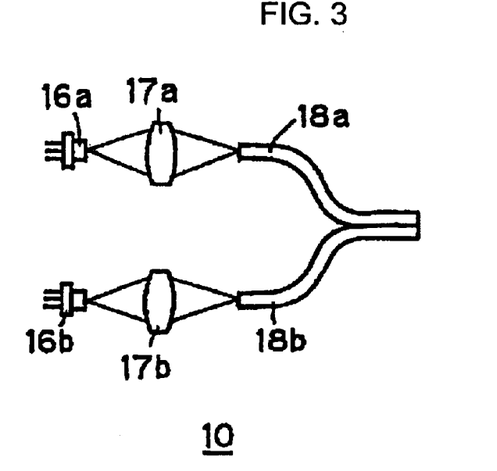
FIG. 3 is a view showing another structure of the light source portion of the optical scanner.

Other examples of the structure of the light source portion 10 are shown in FIGS. 2 and 3. The light source 10 of FIG. 2 comprises two lasers 12a and 12b, two collimator lenses 13a and 13b, a half-wave plate 14, and a polarization beam splitter 15. The lasers 12a and 12b each emit a light beam that is p-polarized with respect to the polarization beam splitter 15. The light beam emitted by the laser 12a is collimated by the collimator lens 13a, is incident on the polarization beam splitter 15, and passes therethrough. The light beam emitted by the laser 12b is collimated by the collimator lens 13b, has the polarization direction thereof rotated by 90° by the half-wave plate 14, is incident on the polarization beam splitter 15 as s-polarized light, and is reflected thereby.

The lasers 12a and 12b and the collimator lenses 13a and 13b are set so that the light beams are incident on slightly different positions of the polarization beam splitter 15, and the two light beams passing through the polarization beam splitter 15 are directed in the same direction so as to be spaced a minute distance apart in the sub scanning direction. The polarization directions of the two light beams are different by 90°. In this structure, the collimator lens 20 is not used.

The light source portion 10 of FIG. 3 comprises two lasers 16a and 16b, two convex lenses 17a and 17b, and two optical fibers 18a and 18b. The light beams emitted by the lasers 16a and 16b are converged by the lenses 17a and 17b, and are incident on one end of each of the optical fibers 18a and 18b that are spaced apart, respectively. The other ends of the optical fibers 18a and 18b are close to each other, and the two light beams exiting from the optical fibers 18a and 18b are directed in the same direction so as to be spaced a minute distance apart in the sub scanning direction. The polarization directions of the two light beams emitted by the optical fibers 18a and 18b are not fixed. The number of light beams emitted by the light source portion 10 may be increased to more than two by increasing the number of sets of lasers, lenses and optical fibers.

Figure 4:
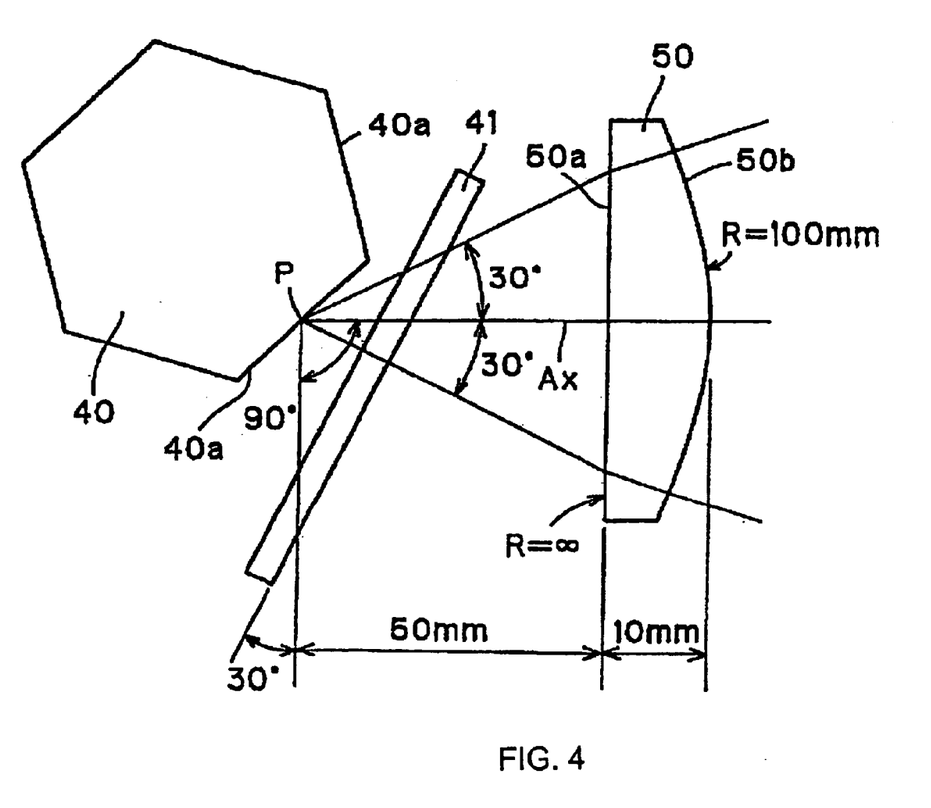
FIG. 4 is a view showing the optical setting of a rotating polygon mirror, a window and an imaging lens of the optical scanner.

The optical arrangement of the rotating polygon mirror 40, the window 41 and the imaging lens 50 is shown in FIG. 4. The incident surface 50a of the imaging lens 50 is a plane surface. The exit surface 50 thereof is a cylindrical surface with a radius of 100 mm. The distance from the incident surface 50a to the vertex of the exit surface 50b is 10 mm. The imaging lens 50 is disposed so that the optical axis Ax thereof is perpendicular to the light beams from the cylindrical lens 30 and the distance from the point of intersection P of the light beams and the optical axis Ax to the incident surface 50a is 50 mm.

The rotating polygon mirror 40 is disposed so that the angle of incidence of the light beams on the mirror surfaces 40a is 45° at the point of intersection P of the optical axis Ax of the imaging lens 50 and the light beams from the cylindrical lens 30. In the optical scanner 1, the range of the main scanning angle is from −30 to +30°, and light beams at angles in the range of −30 to +30° with respect to the optical axis Ax of the imaging lens 50 are used for the main scanning. Consequently, in the main scanning range, the angle of incidence of the light beams on the mirror surfaces 40a of the rotating polygon mirror 40 is 30 to 60°, and the angle of incidence of the light beams on the incident surface 50a of the imaging lens 50 is 0 to 30°.

The window 41 of the case housing the rotating polygon mirror 40 is disposed at an angle of 30° with respect to the light beams from the cylindrical lens 30. Consequently, the angle of incidence of the light beams from the cylindrical lens 30 on the window 41 is 60°, and the angle of incidence of the light beams reflected by the rotating polygon mirror 40 on the window 41 is 0 to 60° in the main scanning range.

Film structures of the mirror surfaces 40a of the rotating polygon mirror 40 are shown in Tables 7 and 8. The refractive index n, the optical film thickness nd and the absorption coefficient k shown in these tables are for a light beam of a wavelength $\lambda$ of 780 nm.

TABLE 7

Reflection surface RA (wavelength $\lambda$ = 780 nm)

| | Material | Refractive Index n | Optical Thickness nd | Absorption Coefficient k |
|---|---|---|---|---|
| First Layer | SiO$_2$ | 1.46 | 0.30$\lambda$ | |
| Second Layer | TiO$_2$ | 2.35 | 0.25$\lambda$ | |
| Third Layer | SiO$_2$ | 1.46 | 0.25$\lambda$ | |
| | Al | 1.92 | | 7.08 |

TABLE 8

Reflection surface RB (wavelength $\lambda$ = 780 nm)

| | Material | Refractive Index n | Optical Thickness nd | Absorption Coefficient k |
|---|---|---|---|---|
| First Layer | MgF$_2$ | 1.38 | 0.22$\lambda$ | |
| | Al | 1.92 | | 7.08 |

The reflection surface RA of Table 7 has three layers of thin films of SiO$_2$ and TiO$_2$ on a reflection film of Al. The thickness nd of the SiO$_2$ film of the first layer situated on the outermost side is 0.30 $\lambda$, and the thickness of the TiO$_2$ film of the second layer and the thickness of the SiO$_2$ film of the third layer are both 0.25.

The reflectance of the TiO$_2$ film of the second layer is the highest, and the reflectances of the first, the second and the third layers are low, high and low, respectively. The reflection surface RB of Table 8 has one layer of thin film of MgF$_2$ on a reflection surface of Al. The thickness of the MgF$_2$ film is 0.22 $\lambda$. Either one of the reflection films RA and RB can be used.

Figure 5:
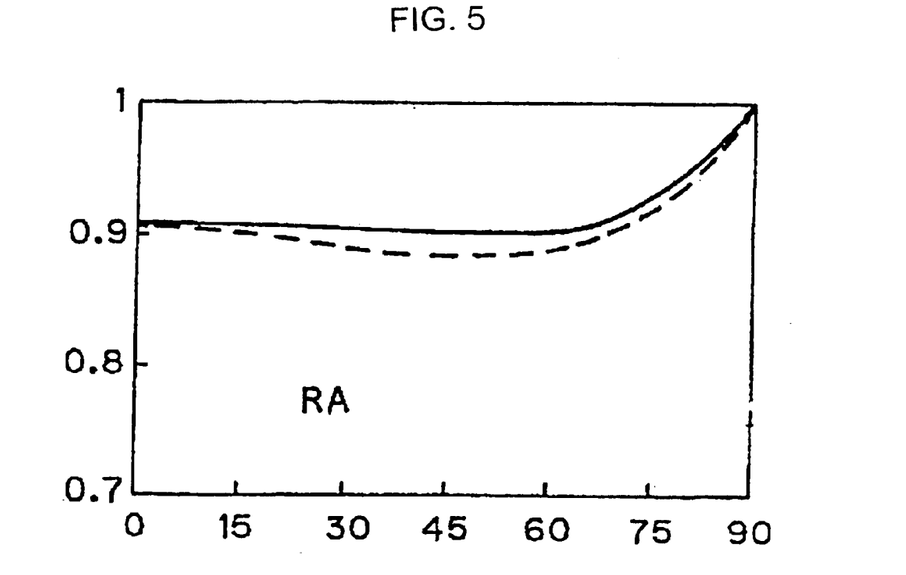
FIG. 5 is a view showing the relationships between the reflectances for s-polarized light and for p-polarized light and the incident angle on a reflection surface RA provided in the optical scanner.
Figure 6:
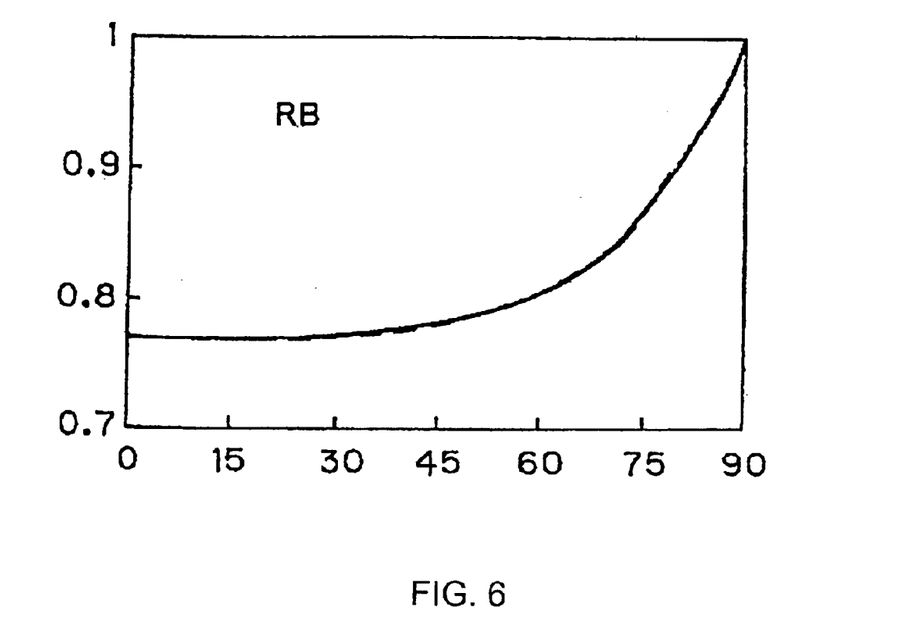
FIG. 6 is a view showing the relationships between the reflectances for s-polarized light and for p-polarized light and the incident angle on a reflection surface RB provided in the optical scanner.

The relationships between the reflectances for s-polarized light and for p-polarized light and the incident angle on the reflection surface RA and the reflection surface RB are shown in FIGS. 5 and 6, respectively. In the graphs of these and subsequent figures, the properties of s-polarized light are represented by a solid line, and the properties of p-polarized light are represented by a dashed line. On the reflection surfaces RA and RB, the reflectance for s-polarized light and the reflectance for p-polarized light are substantially the same at any incident angle in the range of 0 to 90°. While the angle of incidence on the mirror surfaces 40a of the rotating polygon mirror 40 is 30 to 60° as mentioned above, in an incident angle range of 0 to 60° including this, the difference between the reflectance for s-polarized light and the reflectance for p-polarized light is not more than 1.9% on the reflection surface RA and not more than 0.16% on the reflection surface RB.

Therefore, a difference in light quantity due to the difference in polarization direction is hardly caused between the reflected light beams both when the reflection surface RA is adopted and when the reflection surface RB is adopted as the mirror surfaces 40a. The reflectance of the reflection surface RA with the surface structure having three layers is higher than that of the reflection surface RB with the surface structure having one layer at all the incident angles. From the viewpoint of the efficiency of use of light, it is preferable to adopt the reflection surface RA, whereas in the viewpoint of simplification of the manufacturing process, it is preferable to adopt the reflection surface RB.

Of the results of examination of the relationship between the film thicknesses nd of the layers of the reflection surface RA and the difference between the reflectance for s-polarized light and the reflectance for p-polarized light, ones with small differences in reflectance are shown in Table 9.

TABLE 9

Reflection surface RA

| First Layer | Second Layer | Third Layer | Maximum difference in reflectance |
|---|---|---|---|
| 0.20$\lambda$ | 0.40$\lambda$ | 0.20$\lambda$ | 1.9% |
| 0.20$\lambda$ | 0.40$\lambda$ | 0.30$\lambda$ | 2.6% |
| 0.30$\lambda$ | 0.20$\lambda$ | 0.30$\lambda$ | 2.6% |
| 0.30$\lambda$ | 0.20$\lambda$ | 0.40$\lambda$ | 2.9% |
| 0.30$\lambda$ | 0.30$\lambda$ | 0.10$\lambda$ | 1.6% |
| 0.30$\lambda$ | 0.30$\lambda$ | 0.20$\lambda$ | 2.0% |
| 0.40$\lambda$ | 0.10$\lambda$ | 0.30$\lambda$ | 1.6% |

The structures shown in Table 9 are all suitable as the mirror surfaces 40a because the difference between the reflectance for s-polarized light and the reflectance for p-polarized light is not more than 2.9% in the incident angle range of 0 to 60°.

By adding one SiO$_2$ layer and one TiO$_2$ layer so that the reflection surface has five layers, the reflectances of which are low, high, low, high and low, respectively, the difference between the reflectance for s-polarized light and the reflectance for p-polarized light can also be made not more than 3% in the incident angle range of 0 to 60°. Such a film is also suitable as the mirror surfaces 40a although the number of steps of the manufacturing process increases.

Of the results of examination of the relationship among the refractive index n and the film thickness nd of the thin film of the reflection surface RB and the difference between the reflectance for s-polarized light and the reflectance for p-polarized light, ones with small differences in reflectance are shown in Table 10.

TABLE 10

Reflection surface RB

| | Material | Refractive Index n | Optical Thickness nd | Maximum difference in reflectance |
|---|---|---|---|---|
| First Layer | MgF$_2$ | 1.38 | 0.22λ | 0.16% |
| First Layer | SiO$_2$ | 1.46 | 0.20λ | 0.72% |
| First Layer | Al$_2$O$_3$ | 1.62 | 0.19λ | 1.19% |
| First Layer | ZrO$_2$ | 2.10 | 0.17λ | 1.6% |
| First Layer | TiO$_2$ | 2.35 | 0.16λ | 1.1% |

The first structure in Table 10 is the structure shown in Table 8. The other ones are also suitable as the mirror surfaces 40a because the difference between the reflectance for s-polarized light and the reflectance for p-polarized light is not more than 1.6% in the incident angle range of 0 to 60°. In all the structures, the film thickness nd is less than ¼ of the wavelength λ, more specifically, less than ¼ and not less than ⅛.

The film structures of the incident surface 50a of the imaging lens 50 and both surfaces of the window 41 are shown in Table 11. The refractive index n and the optical film thickness nd shown in Table 11 are also for a light beam of a wavelength λ of 780 nm.

TABLE 11

Transmission surface TA (wavelength λ = 780 nm)

| | Material | Refractive Index n | Optical Thickness nd |
|---|---|---|---|
| First Layer | MgF$_2$ | 1.38 | 0.25λ |
| Second Layer | ZrO$_2$ | 2.10 | 0.45λ |
| Third Layer | Al$_2$O$_3$ | 1.62 | 0.25λ |
| | BK7 | 1.51 | |

The transmission surface TA of Table 11 has three layers of thin films of Al$_2$O$_3$, ZrO$_2$ and MgF$_2$ on BK7 glass which is the base material of the element. The thicknesses nd of the MgF$_2$ film of the first layer and the Al$_2$O$_3$ film of the third layer are 0.25 λ which is the same as those of the conventional ones shown in Table 6. However, the thickness nd of the ZrO$_2$ film of the second layer is 0.45 λ which is smaller than the conventional one.

Figure 7:
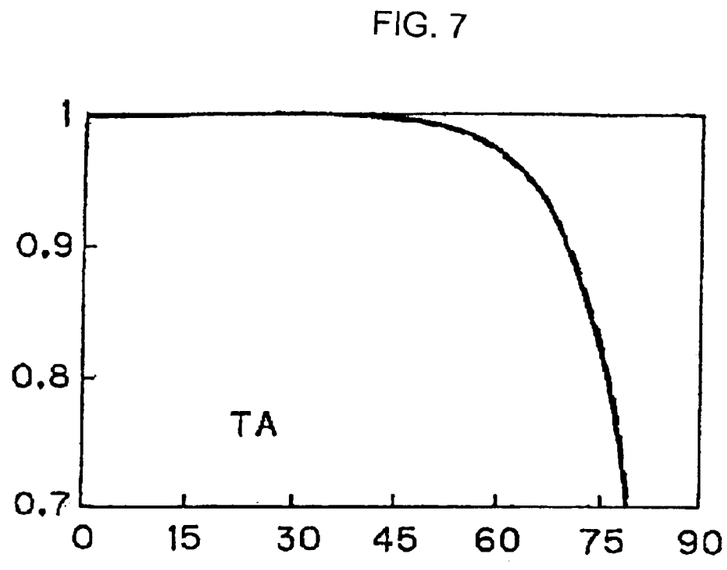
FIG. 7 is a view showing the relationships between the transmittances for s-polarized light and for p-polarized light and the incident angle on a transmission surface TA provided in the optical scanner.

The relationships between the transmittances for s-polarized light and for p-polarized light and the incident angle on the transmission surface TA are shown in FIG. 7. On the transmission surface TA, the transmittance for s-polarized light and the transmittance for p-polarized light are substantially the same at any incident angle in the range of 0 to 90°. Although the angles of incidence on the imaging lens 50 and on the window 41 are 0 to 60° as mentioned above, the difference between the transmittance for s-polarized light and the transmittance for p-polarized light in this incident angle range is not more than 0.19%. Consequently, the transmission surface TA is suitable for the surfaces of the transmission-type elements.

Of the results of examination of the relationship between the film thicknesses nd of the layers of the transmission surface TA and the difference between the transmittance for s-polarized light and the transmittance for p-polarized light, ones with small differences in transmittance are shown in Table 12. Since a relationship that transmittance=(1-reflectance) holds and the difference in transmittance equals the difference in reflectance, the difference in transmittance is expressed as the difference in reflectance in Table 12.

TABLE 12

Transmission surface TA

| First Layer | Second Layer | Third Layer | Maximum difference in reflectance |
|---|---|---|---|
| 0.20λ | 0.40λ | 0.05λ | 0.72% |
| 0.20λ | 0.40λ | 0.10λ | 0.69% |
| 0.20λ | 0.40λ | 0.20λ | 2.74% |
| 0.20λ | 0.45λ | 0.05λ | 0.27% |
| 0.20λ | 0.45λ | 0.50λ | 0.56% |
| 0.20λ | 0.50λ | 0.50λ | 2.57% |
| 0.25λ | 0.30λ | 0.30λ | 0.92% |
| 0.25λ | 0.45λ | 0.10λ | 0.84% |
| 0.25λ | 0.45λ | 0.15λ | 0.68% |
| 0.25λ | 0.45λ | 0.20λ | 0.37% |
| 0.25λ | 0.45λ | 0.25λ | 0.19% |
| 0.25λ | 0.45λ | 0.30λ | 0.87% |
| 0.25λ | 0.50λ | 0.40λ | 0.82% |
| 0.30λ | 0.10λ | 0.20λ | 2.78% |
| 0.30λ | 0.10λ | 0.30λ | 2.43% |
| 0.30λ | 0.20λ | 0.10λ | 2.67% |
| 0.30λ | 0.20λ | 0.30λ | 2.61% |
| 0.30λ | 0.20λ | 0.40λ | 1.54% |
| 0.30λ | 0.20λ | 0.50λ | 1.28% |
| 0.30λ | 0.40λ | 0.10λ | 2.48% |
| 0.30λ | 0.40λ | 0.20λ | 2.73% |
| 0.30λ | 0.50λ | 0.30λ | 1.35% |
| 0.30λ | 0.50λ | 0.40λ | 2.31% |
| 0.35λ | 0.05λ | 0.20λ | 0.65% |
| 0.35λ | 0.05λ | 0.25λ | 0.72% |
| 0.35λ | 0.10λ | 0.35λ | 0.55% |
| 0.35λ | 0.10λ | 0.40λ | 0.40% |
| 0.35λ | 0.10λ | 0.45λ | 1.00% |
| 0.40λ | 0.10λ | 0.20λ | 2.55% |
| 0.40λ | 0.10λ | 0.30λ | 2.44% |
| 0.40λ | 0.10λ | 0.40λ | 1.45% |
| 0.40λ | 0.10λ | 0.50λ | 1.09% |

The structures shown in Table 12 are all suitable for the surfaces of the transmission-type elements because the difference between the transmittance for s-polarized light and the transmittance for p-polarized light is not more than 2.8% in the incident angle range of 0 to 60°.

Figure 8:
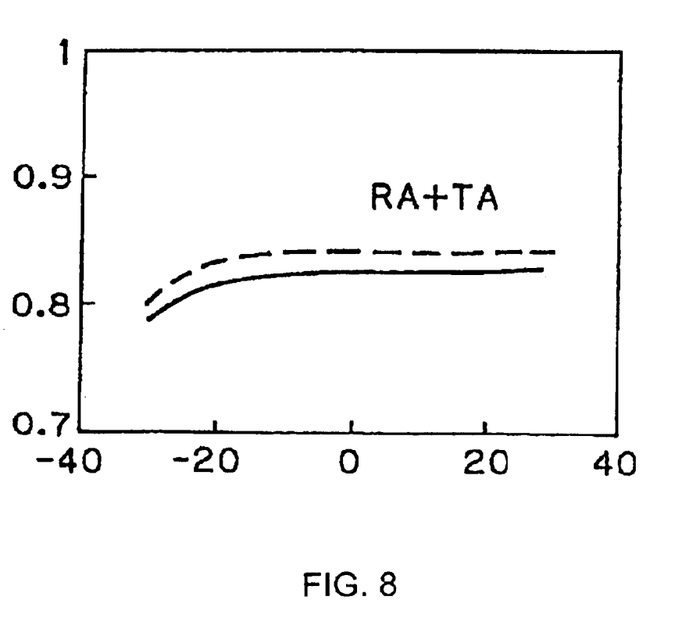
FIG. 8 is a view showing the relationships between the light quantity efficiency and the scanning angle when the reflection surface RA and the transmission surface TA are provided in the optical scanner.

FIG. 8 shows the light quantity efficiencies (the ratios of the light quantities of the beams on the surface M to be scanned to the light quantities of the beams immediately after passing through the cylindrical lens 30) when the reflection surface RA is adopted as the mirror surfaces 40a of the rotating polygon mirror 40 and the transmission surface TA is adopted as the incident surface 50a of the imaging lens 50 and both surfaces of the window 41.

In this figure, the solid line represents the light quantity efficiency when the polarization direction of the light beam coincides with the main scanning direction, and the broken line represents the light quantity efficiency when the polarization direction of the light beam coincides with the sub scanning direction. When the polarization direction coincides with the main scanning direction, the light beam is p-polarized with respect to the mirror surfaces 40a of the rotating polygon mirror 40, the incident surface 50a of the imaging lens 50 and both surfaces of the window 41. When the polarization direction coincides with the sub scanning direction, the light beam is s-polarized with respect to these surfaces.

There is no large difference in light quantity efficiency at any scanning angle in the range of −30 to +30° between when the polarization direction coincides with the main scanning direction and when it coincides with the sub scanning direction; the maximum difference is merely 1.7%. Consequently, even when the polarization directions of a plurality of light beams emitted by the light source portion 10 are different, the light quantities of the light beams on the surface M to be scanned are the same.

Figure 9:
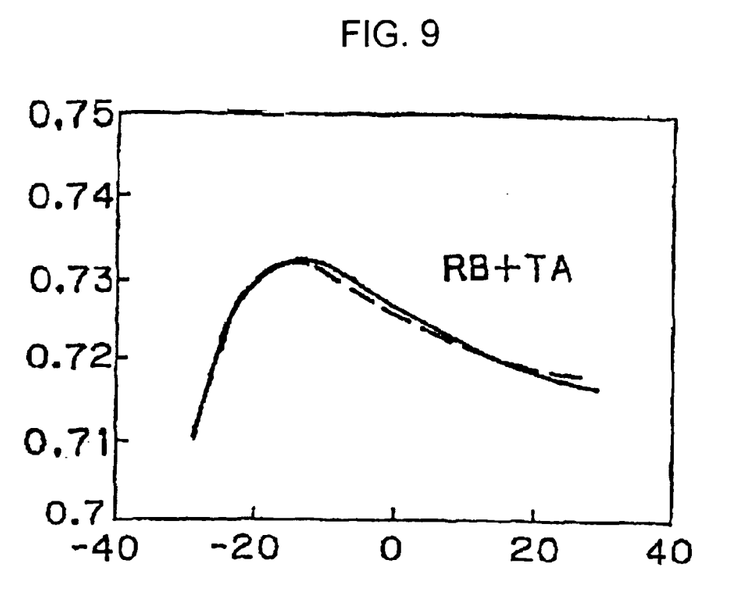
FIG. 9 is a view showing the relationships between the light quantity efficiency and the scanning angle when the reflection surface RB and the transmission surface TA are provided in the optical scanner.

FIG. 9 shows the light quantity efficiencies when the reflection surface RB is adopted as the mirror surfaces 40a of the rotating polygon mirror 40 and the transmission surface TA is adopted as the incident surface 50a of the imaging lens 50 and both surfaces of the window 41. In this case, the difference in light quantity efficiency between when the polarization direction coincides with the main scanning direction and when it coincides with the sub scanning direction is smaller; the maximum difference is 0.11%. FIG. 9 is magnified in the vertical direction compared to FIG. 8 in order to avoid complete coincidence of the curved line (solid line) when the polarization direction coincides with the main scanning direction and the curved line (broken line) when the polarization direction coincides with the sub scanning direction.

In reducing the difference in light quantity due to the non-alignment of polarization direction of the light beams, the reflection surface RB is superior to the reflection surface RA. However, since the light quantity efficiency is approximately 10% higher when the reflection surface RA is used than when the reflection surface RB is used, it can be said that the reflection surface RA is superior in the absolute light quantity efficiency. The light quantity efficiency is substantially the same over the entire scanning angle range of −30 to +30° both when the reflection surface RA is used and when the reflection surface RB is used, and the light quantities of the light beams are substantially independent of the scanning angle. Consequently, an image of a uniform density can be formed on the entire area of the surface M to be scanned.

Figure 10:
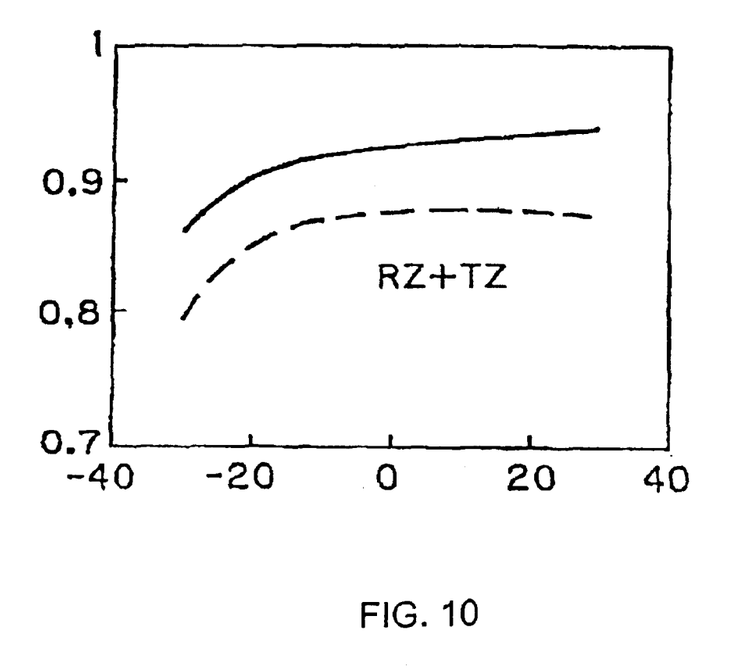
FIG. 10 is a view showing the relationships between the light quantity efficiency and the scanning angle when the conventional reflection surface RZ and transmission surface TZ are provided in the optical scanner.

For comparison, FIG. 10 shows the light quantity efficiencies when the conventional reflection surface RZ shown in Table 3 is adopted as the mirror surfaces 40a of the rotating polygon mirror 40 and the conventional transmission surface TZ shown in Table 6 is adopted as the incident surface 50a of the imaging lens 50 and both surfaces of the window 41. In this case, a large difference in light quantity efficiency is caused at any scanning angle in the range of −30 to +30°; the maximum difference is as much as 6.6%. Moreover, the light quantity efficiency varies according to the scanning angle, and the variation amount is as large as close to 10%. By comparing FIG. 10 with FIGS. 8 and 9, it can be seen that the use of the reflection surface RA or RB and the transmission surface TA as the reflection surfaces and the transmission surfaces is effective where the incident angle varies over a significant range.

While in the optical scanner 1 of the figures, the light beams emitted by the light source 10 are directed to the rotating polygon mirror 40 without first being reflected, in a case where a reflecting mirror is disposed between the light source portion 10 and the rotating polygon mirror 40 to bend the optical paths of the light beams, the reflection surface RA or RB may be adopted also for the mirror surfaces of such a reflecting mirror. Similarly, if the optical scanner employs an imaging mirror as an alternative to the imaging lens 50, the reflection surface RA or RB can be employed on such an imaging mirror.

While in the disclosed embodiment, the transmission surface TA is not adopted as the exit surface 50b of the imaging lens 50 and for the collimator lens 20 and the cylindrical lens 30, the transmission surface TA may be adopted for all the transmission-type elements. This does not result in significant reduction in manufacture efficiency or increase in cost because the reflection surfaces RA and RB and the transmission surface TA are simple in film structure and easy to manufacture.

In the optical scanner of the present invention, in which an optical element having a surface where the reflectance for s-polarized light and the reflectance for p-polarized light are substantially the same at a given incident angle is provided in the optical paths of a plurality of light beams, the light quantities of the light beams reflected by the optical element or passing through the optical element can be made the same without the provision of means for making the polarization directions of the light beams the same. In addition, the light quantity difference among the beams does not vary according to the angle of incidence on the surface of the optical element. Consequently, the light quantities of a plurality of light beams can easily be made the same at respective parts of the surface to be scanned, and when the optical scanner is provided, for example, in an image forming apparatus such as a laser beam printer, an excellent image without any nonuniformity of density even in a peripheral region can be provided.

The surface where the reflectance for s-polarized light and the reflectance for p-polarized light are substantially the same at a given incident angle can be realized with a simple film structure both when the surface is a reflection surface and when it is a transmission surface. For example, the reflection surface may comprise one or three layers, and the transmission surface may comprise three layers. Since these structures are as simple as or simpler than conventional structures, an apparatus that is low in cost while having the above-described characteristics is realized.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An optical scanner for deflecting a plurality of light beams at a given wavelength λ from a light source towards a surface to be scanned, said scanner including at least one optical element having a surface which reflects said light beams, said surface comprising a thin film in which the reflectance of s-polarized light at said given wavelength and p-polarized light at said given wavelength differ by no more than 3.0% over any incidence angle in the range of 0–60°.

2. The optical scanner of claim 1 wherein said difference is no greater than 1.9%.

3. The optical scanner of claim 2 wherein said thin film comprises a first, outermost layer of $SiO_2$, a second layer of $TiO_2$, and a third layer of $SiO_2$, and wherein the reflectance of said second layer is higher than the reflectance of each of said first and third layers.

4. The optical scanner of claim 1 wherein said difference is no greater than 0.16%.

5. The optical scanner of claim 4 wherein said thin film comprises a layer of $MgF_2$ having a thickness less than 0.25 λ.

6. The optical scanner of claim 5 wherein said thickness is about 0.22 λ.

7. An optical scanner for deflecting a plurality of light beams at a given wavelength λ from a light source towards a surface to be scanned, said scanner including at least one optical element having a surface through which said light beams are transmitted, said surface comprising a thin film in which the reflectance of s-polarized light at said given wavelength and p-polarized light at said given wavelength differ by no more than 3.0% over any incidence angle in the range of 0–60°.

8. The optical scanner of claim 7 wherein said difference is no greater than 0.19%.

9. The optical scanner of claim 8 wherein said thin film comprises a first, outermost layer of $MgF_1$, a second layer of $ZrO_2$, and a third layer of $Al_2O_3$.

10. The optical scanner of claim 9 wherein the reflectance of said second layer is greater than the reflectance of each of said first and third layers.

11. The optical scanner of claim 9 wherein said second layer has a thickness less than 0.50 $\lambda$.

12. The optical scanner of claim 11 wherein said thickness is about 0.45 $\lambda$.

13. An optical scanner comprising:
- a light source for emitting a plurality of light beams in which a polarization direction of at least one of the light beams is different from polarization directions of the other light beams;
- a deflector for deflecting the plurality of light beams emitted from the light source to scan the light beams over a surface to be scanned; and
- an optical surface provided between the light source and said surface to be scanned in the optical paths of the light beams, the optical surface having a reflectance for s-polarized light and a reflectance for p-polarized light that are substantially the same at a predetermined incident angle to the optical surface.

14. The optical scanner of claim 13, wherein said optical surface is provided on a reflection-type optical element.

15. The optical scanner of claim 14, wherein said optical surface is provided on a polygon mirror.

16. The optical scanner of claim 14, wherein said optical surface is provided on a mirror located between the light source and the deflector.

17. The optical scanner of claim 14, wherein said optical surface is provided on an imaging mirror.

18. The optical scanner of claim 13, wherein said optical surface is provided on a transmission-type optical element.

19. The optical scanner of claim 18, wherein said optical surface is provided on a imaging lens.

20. The optical scanner of claim 18, wherein said optical surface is provided on a glass window.

21. The optical scanner of claim 18, wherein said optical surface is provided on a collimator lens.

22. The optical scanner of claim 18, wherein said optical surface is provided on a cylindrical lens.

23. The optical scanner of claim 13, wherein the difference between the reflectance for s-polarized light and the reflectance for p-polarized light is not more than 3%.

24. An optical scanner for deflecting a plurality of light beams at a given wavelength $\lambda$ from a light source towards a surface to be scanned, said scanner including at least one optical element having a surface which receives said light beams, said surface comprising a thin film in which the reflectance of s-polarized light at said given wavelength and p-polarized light at said given wavelength differ by no more than 3.0% over any incidence angle in the range of 0–60°.

25. The optical scanner of claim 1, wherein a polarization direction of at least one of the light beams is different from polarization directions of the other light beams.

26. The optical scanner of claim 7, wherein a polarization direction of at least one of the light beams is different from polarization directions of the other light beams.

27. The optical scanner of claim 24, wherein a polarization direction of at least one of the light beams is different from polarization directions of the other light beams.

* * * * *